(12) United States Patent
Iwata et al.

(10) Patent No.: US 7,810,356 B2
(45) Date of Patent: Oct. 12, 2010

(54) PROCESS AND APPARATUS FOR PRODUCING POROUS QUARTZ GLASS BASE

(75) Inventors: Kei Iwata, Fukushima (JP); Takao Uto, Fukushima (JP); Takuya Sakuma, Fukushima (JP)

(73) Assignee: Asahi Glass Company, Limited, Tokyo (JP)

( * ) Notice: Subject to any disclaimer, the term of this patent is extended or adjusted under 35 U.S.C. 154(b) by 248 days.

(21) Appl. No.: 11/835,668

(22) Filed: Aug. 8, 2007

(65) Prior Publication Data

US 2008/0006058 A1 Jan. 10, 2008

Related U.S. Application Data

(63) Continuation of application No. PCT/JP2006/302595, filed on Feb. 8, 2006.

(30) Foreign Application Priority Data

Feb. 8, 2005 (JP) ................. 2005-031557

(51) Int. Cl.
*C03B 37/18* (2006.01)
(52) U.S. Cl. ............... 65/376; 65/436; 427/452; 427/189; 427/574; 427/588
(58) Field of Classification Search .......... 427/219, 427/243, 248.1, 452, 189, 574, 588, 255.37; 65/376, 436
See application file for complete search history.

(56) References Cited

U.S. PATENT DOCUMENTS

| | | | | | |
|---|---|---|---|---|---|
| 4,098,595 | A | * | 7/1978 | Lenz et al. ............ | 65/17.2 |
| 4,826,521 | A | * | 5/1989 | Wiechmann et al. ...... | 65/17.2 |
| 5,609,666 | A | * | 3/1997 | Heitmann ............... | 65/421 |
| 6,355,587 | B1 | * | 3/2002 | Loxley et al. ........... | 501/54 |
| 2004/0099014 | A1 | * | 5/2004 | Kusano et al. .......... | 65/413 |
| 2004/0258596 | A1 | * | 12/2004 | Hirano et al. .......... | 423/240 S |

FOREIGN PATENT DOCUMENTS

| JP | 59-039737 | * | 3/1984 |
|---|---|---|---|
| JP | 62-72536 | * | 4/1987 |
| JP | 62-91432 | * | 4/1987 |

(Continued)

OTHER PUBLICATIONS

Isobe, Hiroshi, et al., "Porous Silica Particles Prepared from Silicon Tetrachloride Using Ultrasonic Spray Method". Journal of Colloid and Interface Science, 212, pp. 234-241 (1999).*

*Primary Examiner*—Bret Chen
(74) *Attorney, Agent, or Firm*—Oblon, Spivak, McClelland, Maier & Neustadt, L.L.P.

(57) ABSTRACT

The present invention provides a process for producing a porous quartz glass base, which comprises hydrolyzing a silicon compound in an oxyhydrogen flame in a reaction furnace to generate and deposit fine silica particles on a starting member, thereby forming a porous quartz glass base, wherein a gas discharge pipe for discharging an unnecessary gas from the reaction furnace is heated. According to the present invention, fine silica particles can be prevented from adhering to a gas discharge pipe for discharging the unnecessary hydrogen chloride gas generated in producing a porous quartz glass base.

11 Claims, 2 Drawing Sheets

FOREIGN PATENT DOCUMENTS

| | | | |
|---|---|---|---|
| JP | 3-34419 | * | 2/1991 |
| JP | 07-300333 | | 11/1995 |
| JP | 226530 | * | 2/1997 |
| JP | 10-226530 | | 8/1998 |
| WO | WO 97/16382 | * | 5/1997 |
| WO | WO 02/10081 | * | 2/2002 |

* cited by examiner

PROCESS AND APPARATUS FOR PRODUCING POROUS QUARTZ GLASS BASE

TECHNICAL FIELD

The present invention relates to a process and apparatus for producing a porous quartz glass base, in which a gas discharge pipe disposed for discharging outside an unnecessary gases, e.g., hydrogen chloride gas, generated in producing a high-purity quartz glass base can be effectively prevented from suffering adhesion of fine silica particles to the inner surface thereof and being thus narrowed or clogged.

BACKGROUND ART

One known process for producing a quartz glass comprises forming a porous quartz glass base by a vapor-phase reaction and heating this porous quartz glass base to vitrify it. With respect to the production of a porous quartz glass base to be used for forming, e.g., optical fibers, lenses, prisms, and other various optical materials, the process called the VAD method (vapor-phase axial deposition method) is widely known (see, for example, patent document 1).

In this VAD method, a raw material gas such as, e.g., silicon tetrachloride ($SiCl_4$) and a fuel gas such as hydrogen and oxygen are supplied from a burner to a lower-end part of a rod-shape member made of a quartz glass (hereinafter referred to as a target) which is a starting member perpendicularly hung down in a reaction furnace. The raw material gas is hydrolyzed in an oxyhydrogen flame, and the fine silica particles ($SiO_2$) thus yielded are adhered to and deposited on the lower-end part of the target to thereby form a porous quartz glass base. Subsequently, this porous quartz glass base is transferred to a heating furnace and sintered by heating with a heater to thereby obtain a transparent glass.

In producing a porous quartz glass base by the method described above, the following flame hydrolysis reaction occurs.

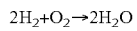

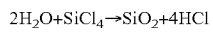

As a result, hydrogen chloride gas (HCl), which is unnecessary, is generated simultaneously with fine silica particles, which are necessary as a raw material for glass. Because of this, a technique for removal is being employed, such as, e.g., that shown in FIG. 3. In this technique, a cleaning column 102 is disposed besides the reaction furnace 101 for forming a porous quartz glass base 110 therein. The hydrogen chloride gas and other gases generated in the reaction furnace 101 are sent to the cleaning column 102 through a gas discharge pipe 103. In this cleaning column 102, the gases are sprinkled from above with water to yield hydrochloric acid 111. The acid is then discharged outside. This cleaning column 102 is equipped with a gas discharge pipe 104, a valve 105, and a gas discharge fan 106 for the purpose of regulating gas discharge amount, i.e., the amount of the gases including hydrogen chloride gas which come into the cleaning column 102 through the gas discharge pipe 103. By adjusting the degree of opening of the valve 105, the amount of the gases to be discharged is controlled.

Patent Document 1: JP-A-62-72536

However, in this apparatus for producing a porous quartz glass base, there are cases where fine silica particles come together with hydrogen chloride gas and other gases into the gas discharge pipe 103 which communicates the reaction furnace 101 with the cleaning column 102. These fine silica particles have a temperature as high as about 500° C. immediately after having entered the gas discharge pipe 103 from the reaction furnace 101. On the other hand, even the inner wall surface of the gas discharge pipe 103 is in a relatively low-temperature state because the outer wall surface of the gas discharge pipe 103 is frequently exposed to the surrounding atmosphere. Consequently, the fine silica particles which have entered the gas discharge pipe 103 are rapidly cooled and adhere to the inner wall surface of the gas discharge pipe 103 to narrow the passage. As a result, the flow rate of the gases including hydrogen chloride gas in the gas discharge pipe 103 changes and this in turn exerts adverse influences to cause, e.g., a decrease in the productivity of a porous quartz glass base. Because of these circumstances, it has been necessary to frequently clean the inside of the gas discharge pipe 103 in the course of the production of a porous quartz glass base. This cleaning operation has been troublesome.

DISCLOSURE OF THE INVENTION

The invention has been achieved under the circumstances described above.

An object of the invention is to provide a process and apparatus for producing a porous quartz glass base which are effective in inhibiting fine silica particles from adhering to a gas discharge pipe for discharging unnecessary gases such as hydrogen chloride gas to thereby eliminate the necessity of frequently cleaning the gas discharge pipe and increase the productivity of the base.

The invention provides a process for producing a porous quartz glass base which comprises hydrolyzing a silicon compound in an oxyhydrogen flame in a reaction furnace to generate and deposit fine silica particles on a starting member, thereby forming a porous quartz glass base, wherein a gas discharge pipe for discharging an unnecessary gas from the reaction furnace is heated.

The invention further provides the process for producing a porous quartz glass base as described above, wherein the gas discharge pipe is heated so that the temperature in the gas discharge pipe is not lower than the temperature of the gas that is upon entry into the gas discharge pipe.

The invention furthermore provides an apparatus for producing a porous quartz glass base with which a silicon compound is hydrolyzed in an oxyhydrogen flame in a reaction furnace to generate and deposit fine silica particles on a starting member, thereby forming a porous quartz glass base, which apparatus has a heating member for heating a gas discharge pipe for discharging an unnecessary gas from the reaction furnace.

The invention still further provides the apparatus for producing a porous quartz glass base as described above, wherein the heating member heats the gas discharge pipe so that the temperature in the gas discharge pipe is not lower than the temperature of the gases that is upon entry into the gas discharge pipe.

According to the invention, since fine silica particles which have entered a gas discharge pipe are heated in the gas discharge pipe, the fine silica particles which have entered the gas discharge pipe in the production of a porous quartz glass base can be effectively inhibited from being rapidly cooled and adhering to the inner surface of the gas discharge pipe. Consequently, a process and apparatus for producing a porous quartz glass base can be provided in which the flow rate of the gases including hydrogen chloride gas in the gas discharge pipe is kept constant and, hence, the pressure state in the reaction furnace can be always kept stable, whereby the efficiency of the production of the base can be greatly increased.

In addition, the process and apparatus are free from the necessity of frequently cleaning the gas discharge pipe.

Figure 1:
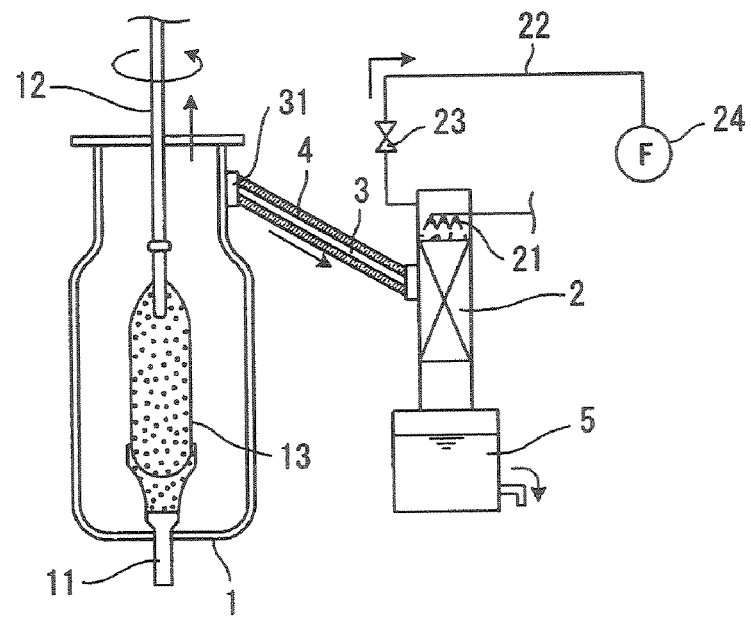
FIG. 1 is a diagrammatic view illustrating the constitution of an embodiment of the apparatus of the invention for producing a porous quartz glass base.

The reference numerals used in the drawings denote the followings, respectively.

1: Reaction furnace
11: Burner
12: Starting member (target)
13: Porous quartz glass base (base)
2: Cleaning column
21: Nozzle
22: Gas discharge pipe
23: Valve
24: Gas discharge fan
3: Gas discharge pipe
4: Heater
7: Heat insulator

BEST MODE FOR CARRYING OUT THE INVENTION

An embodiment of the invention will be explained below in detail by reference to accompanying drawings.

FIG. 1 illustrates an embodiment of the apparatus of the invention for producing a porous quartz glass base. This apparatus for producing a porous quartz glass base has a heating member 4 disposed for a gas discharge pipe 3 which communicates a reaction furnace 1 with a cleaning column 2.

In the reaction furnace 1 the inside of which is kept at a high temperature, a raw material gas sent from a burner 11 is hydrolyzed in an oxyhydrogen flame, and the resultant fine silica particles ($SiO_2$) in a soot form are adhered to and deposited on a target 12 to thereby form a porous quartz glass base (hereinafter referred to as base) 13. In this operation, hydrogen chloride gas (HCl), which is unnecessary, generates together with inert gases. The intake 31 of the gas discharge pipe 3 has hence been attached to the reaction furnace 1. Through this gas discharge pipe 3, gases such as the hydrogen chloride gas and part of the inert gases (e.g., nitrogen gas) are discharged toward the cleaning column 2.

In the cleaning column 2, the hydrogen chloride gas introduced through the gas discharge pipe 3 is sprinkled with water from nozzles 21 disposed in an upper part of the column. As a result, an aqueous hydrochloric acid solution 5 generates. This acid is discharged outside.

The gas discharge pipe 3 is a pipe for discharging outside the unnecessary gases generated in the reaction furnace 1, such as hydrogen chloride gas and inert gases. This pipe is constituted of an appropriate material which withstands the temperature of these gases passing through the pipe. The gases are discharged from the reaction furnace 1 into the cleaning column 2 by a pressure difference between the reaction furnace 1 and the cleaning column 2.

The pressure in the gas discharge pipe 3 is regulated so as to be in the range of from "atmospheric pressure minus 30 Pa" to the "atmospheric pressure", while the pressure in the furnace is kept constant. In case where the pressure in the gas discharge pipe is lower than the "atmospheric pressure minus 30 Pa", excessive gas discharge from the furnace occurs, leading to breakage of the base and a decrease in yield. When the pressure in the gas discharge pipe exceeds atmospheric pressure, gas discharge from the furnace is insufficient and there are cases where silica adhesion occurs in an upper part of the furnace to cause breakage of the base.

The length of the gas discharge pipe 3 is preferably from 500 mm to 1,000 mm. Although the gas discharge pipe having a smaller length is less apt to suffer the adhesion of fine silica particles to the inner surface thereof, too small lengths may result in a possibility that the water sprinkled in the cleaning column 2 might come into the furnace.

The inner diameter of the gas discharge pipe 3 is preferably 50 to 100 mm. The reasons for this are as follows. In case where the inner diameter thereof is smaller than 50 mm, the gas discharge pipe 3 is apt to suffer silica adhesion and clogging. In case where the inner diameter thereof is larger than 100 mm, the flow rate of the gases being discharged cannot be sufficiently increased or fluctuations in gas discharge conditions are apt to influence the inside of the furnace.

A pipe having a proper inner diameter (100 mm in this embodiment) is used as the gas discharge pipe 3 so that the gases passing through the inside thereof can have a flow rate which is neither too high nor too low and the gases are discharged always at a constant optimal flow rate. Thus, the inside of the reaction furnace 1 is kept in an optimal state regarding pressure, temperature, etc., whereby the flame hydrolysis reaction can be efficiently conducted and the fine silica particles yielded in the reaction furnace 1 are prevented from wastefully discharged through the gas discharge pipe 3. Namely, the fine silica particles can be adhered to and deposited on the target 12 without fail. In this gas discharge pipe 3, the temperature of the gases passing through the pipe as measured around the intake 31 is about 570° C., and the temperature thereof as measured around the ejection opening is about 100° C.

Inconel or a quartz glass is used as the material of the gas discharge pipe 3 from the standpoints of heat resistance and acid resistance. When other materials are used, the part where chlorine gas comes into contact with water reacts with aqueous hydrochloric acid solution, etc. and is apt to corrode.

As in the apparatus heretofore in use, the cleaning column 2 is equipped with a gas discharge pipe 22, a valve 23, and a gas discharge fan 24 for the purpose of regulating gas discharge amount, i.e., the amount of the gases including hydrogen chloride gas which come into the cleaning column 2 through the gas discharge pipe 3. By adjusting the degree of opening of the valve 23, the amount of the gases to be discharged is controlled.

Figure 2:
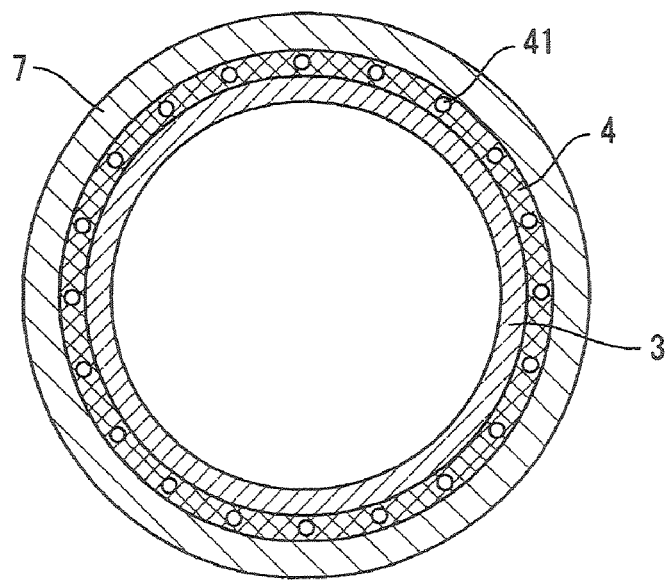
FIG. 2 is a diagrammatic sectional view illustrating the gas discharge pipe in the embodiment of the invention.

As shown in FIG. 2, the heating member 4 has been disposed so as to surround the outer peripheral surface of the gas discharge pipe 3 and heat the gas discharge pipe 3 for the purpose of preventing a trouble, for example, that the fine silica particles which have entered the gas discharge pipe 3 together with the hydrogen chloride gas passing through the pipe 3 are cooled by the gas discharge pipe 3 and adhere to the inner wall surface thereof to narrow or clog the gas discharge pipe.

This heating member 4 heats the gas discharge pipe 3 so that the temperature in the gas discharge pipe 3 (T) is not lower than the temperature of the gases as measured when the gases enter the gas discharge pipe 3 (e.g., 570° C.$\leq$T$\leq$700° C. in this embodiment). For attaining this, a ribbon heater is used as the heating member 4 in this embodiment. This ribbon heater is a flexible heater comprising a strip (ribbon) fabric woven of glass fibers and nichrome wires 41 evenly attached as heating elements to the fabric. The heating elements each have been covered with glass fibers and wrapped in a glass cloth. This ribbon heater is equipped with a temperature controller not shown in the figure, such as a temperature regulator or a voltage regulator. The heater is manually (or automatically) regulated, based on temperature information sent from a temperature-measuring device disposed in the pipe, so that the inside of the gas discharge pipe 3 is always kept at a temperature within the desired temperature range shown above. As shown in FIG. 2, the gas discharge pipe 3 is surrounded outside by a heat insulator 7 so as to prevent the heat generated by the heating member 4 from being removed by the surrounding atmosphere.

EXAMPLES

The present invention will be illustrated in greater detail with reference to the following Examples, but the invention should not be construed as being limited thereto and various changes and modifications can be made therein without departing from the spirit and scope thereof.

Example 1

An example of the invention is explained below.

In Example 1 (present invention) is used an apparatus for producing a porous quartz glass base which comprises a reaction furnace 1 and a cleaning column 2 as shown in FIG. 1. The gas discharge pipe 3 communicating the reaction furnace 1 with the cleaning column 2 has an inner diameter of 100 mm. A heating member 4 comprising a ribbon heater (see FIG. 2) has been attached to the outer periphery of this gas discharge pipe 3. A heat insulator 7 has been wound around the outer periphery of this heating member.

Example 2

Figure 3:
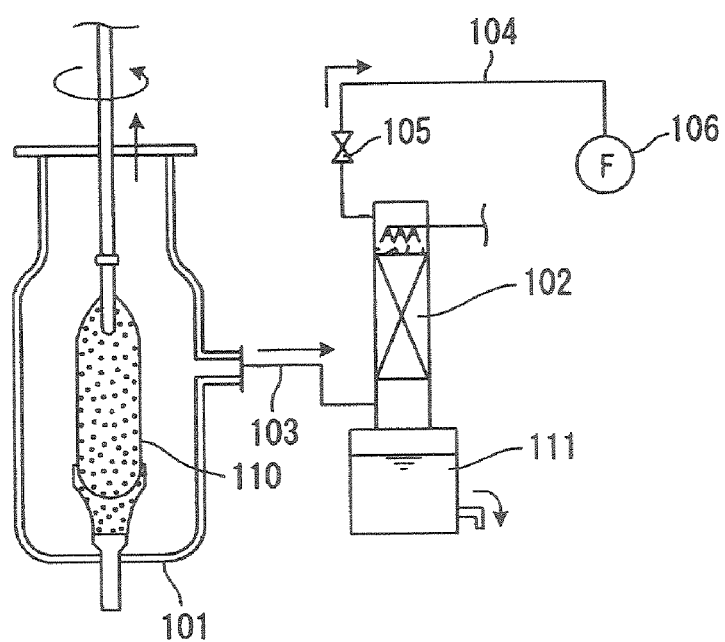
FIG. 3 is a diagrammatic view illustrating the constitution of an existing apparatus for producing a porous quartz glass base.

On the other hand, an existing apparatus for producing a porous quartz glass base shown in FIG. 3 was used in Example 2 (comparative example). Namely, the apparatus of Example 2 has a gas discharge pipe having the same inner diameter as in the apparatus of Example 1. However, this gas discharge pipe has no heating member, and only a heat insulator has been wound around the outer periphery thereof.

Subsequently, the apparatus of Example 1 for producing a porous quartz glass base (present invention) and the apparatus of Example 2 for producing a porous quartz glass base (comparative example) were operated for the same period (e.g., about 40 hours) to produce a base. After this operation, each apparatus was examined as to how much fine silica particles had adhered to the inner wall surface of the gas discharge pipe. As a result, it was found that the inside of the gas discharge pipe 3 in Example 1 had suffered adhesion of fine silica particles in an amount of about 20% of the overall inner diameter thereof in terms of the proportion of the silica deposit in an inner-diameter direction (percentage of opening, 80%), while the inside of the gas discharge pipe in Example 2 had suffered adhesion of fine silica particles in an amount of about 40% of the overall inner diameter thereof (percentage of opening, 60%), as shown in Table 1 below.

TABLE 1

| | Inner diameter of gas discharge pipe | Percentage of opening |
|---|---|---|
| Example 1 (present invention) | 100 mm | 80% |
| Example 2 (comparative example) | 100 mm | 60% |

It was thus found that the apparatus of Example 1 (present invention), which is equipped with a heating member, is effective in halving the degree of adhesion of fine silica particles to the gas discharge pipe as compared with the apparatus of Example 2 (comparative example).

INDUSTRIAL APPLICABILITY

Since the invention has the constitution in which fine silica particles passing through the gas discharge pipe are heated, the fine silica particles during the production of a porous quartz glass base can be effectively inhibited from being cooled and adhering to the inner surface of the gas discharge pipe. The invention hence has effects that there is no need of frequently cleaning the gas discharge pipe and the efficiency of base production can be greatly increased. The invention is useful in, e.g., apparatus for producing a porous quartz glass base by the VAD method or the like.

This application is based on Japanese Patent Application No. 2005-031557 filed Feb. 8, 2005, the contents thereof being herein incorporated by reference.

The invention claimed is:

1. A process for producing a porous quartz glass base, which comprises hydrolyzing a silicon compound in an oxyhydrogen flame in a reaction furnace to generate and deposit fine silica particles on a starting member, thereby forming a porous quartz glass base,
wherein a gas discharge pipe for discharging an unnecessary gas from the reaction furnace is heated so that the temperature in the gas discharge pipe is not lower than the temperature of the gas upon entry into the gas discharge pipe.

2. The process for producing a porous quartz glass base of claim 1, wherein the temperature of the gas upon entry into the gas discharge pipe is 570-700° C.

3. The process for producing a porous quartz glass base of claim 1, wherein the gas discharge pipe is made of a material which is either Inconel or a quartz glass.

4. The process for producing a porous quartz glass base of claim 1, wherein the pressure in the gas discharge pipe is in the range of from atmospheric pressure minus 30 Pa to atmospheric pressure.

5. The process for producing a porous quartz glass base of claim 1, wherein the gas discharge pipe has a length of from 500 mm to 1,000 mm.

6. The process for producing a porous quartz glass base of claim 5, wherein the gas discharge pipe has an inner diameter of from 50 to 100 mm.

7. The process for producing a porous quartz glass base of claim 1, wherein the gas discharge pipe has an inner diameter of from 50 to 100 mm.

8. The process for producing a porous quartz glass base of claim 1, wherein the gas discharge pipe is heated by a ribbon heater which surrounds the outer circumference of the gas discharge pipe.

9. The process for producing a porous quartz glass base of claim 8, wherein the ribbon heater is a flexible heater comprising a ribbon fabric woven of glass fibers and nichrome wires attached to the fabric.

10. The process for producing a porous quartz glass base of claim 8, wherein a heat insulator surrounds the ribbon heater.

11. The process for producing a porous quartz glass base of claim 1, wherein the gas discharge pipe is attached to the reaction furnace.

* * * * *